(12) United States Patent
Yu

(10) Patent No.: US 10,982,086 B1
(45) Date of Patent: Apr. 20, 2021

(54) RESIN GUARDRAIL

(71) Applicants: Caris Co., Ltd., Uijeongbu-si (KR); Cheol Yu, Uijeongbu-si (KR)

(72) Inventor: Cheol Yu, Uijeongbu-si (KR)

(73) Assignees: Caris Co., Ltd., Uijeongbu-si (KR); Cheol Yu, Uijeongbu-si (KR)

( * ) Notice: Subject to any disclaimer, the term of this patent is extended or adjusted under 35 U.S.C. 154(b) by 0 days.

(21) Appl. No.: 16/635,545

(22) PCT Filed: Oct. 23, 2019

(86) PCT No.: PCT/KR2019/013925
§ 371 (c)(1),
(2) Date: Jan. 30, 2020

(87) PCT Pub. No.: WO2020/101201
PCT Pub. Date: May 22, 2020

(30) Foreign Application Priority Data

Jul. 23, 2019 (KR) .................. 10-2019-0088823

(51) Int. Cl.
*C08L 55/02* (2006.01)
*C08L 27/06* (2006.01)
(Continued)

(52) U.S. Cl.
CPC .............. *C08L 55/02* (2013.01); *B01J 13/18* (2013.01); *C08L 27/06* (2013.01);
(Continued)

(58) Field of Classification Search
CPC ........ E01F 15/02; E01F 15/04; E01F 15/0453
See application file for complete search history.

(56) References Cited

U.S. PATENT DOCUMENTS

| | | | | |
|---|---|---|---|---|
| 5,530,051 A | * | 6/1996 | Hirata | C08K 3/08 524/437 |
| 8,807,864 B2 | * | 8/2014 | Kulkarni | E01F 15/04 404/6 |

(Continued)

FOREIGN PATENT DOCUMENTS

| | | | |
|---|---|---|---|
| CN | 110105642 A | * | 8/2019 |
| KR | 920001795 B1 | * | 3/1992 |

(Continued)

*Primary Examiner* — Jonathan P Masinick
(74) *Attorney, Agent, or Firm* — Revolution IP, PLLC

(57) ABSTRACT

The present invention relates to a resin guardrail consisting of a resin composition containing polyvinyl chloride (PVC) and acrylonitrile-butadiene-styrene (ABS) and fixed to a vertical post (P) and, more particularly, relates to a resin guardrail having improved durability and impact resistance, the resin guardrail being produced through extrusion molding of the resin composition containing polyvinyl chloride (PVC) and acrylonitrile-butadiene-styrene (ABS) and made by mixing 1 to 10 parts by weight of microcapsules containing acrylic acid ($CH_2=CHCOOH$), hydrogen peroxide ($H_2O_2$), lithium nitrate trihydrate ($LiNO_3 3H_2O$), and acrylonitrile ($CH_2CHCN$), based on 100 parts by weight of resin mixture containing the PVC compound and the ABS compound mixed at a weight ratio of 50:50 to 90:10.

5 Claims, 4 Drawing Sheets

(51) Int. Cl.
*E01F 15/04* (2006.01)
*C08K 5/315* (2006.01)
*C08K 5/09* (2006.01)
*C08K 3/28* (2006.01)
*C08K 5/14* (2006.01)
*B01J 13/18* (2006.01)

(52) U.S. Cl.
CPC ............ *E01F 15/0453* (2013.01); *C08K 3/28* (2013.01); *C08K 5/09* (2013.01); *C08K 5/14* (2013.01); *C08K 5/315* (2013.01)

(56) References Cited

U.S. PATENT DOCUMENTS

| | | | | |
|---|---|---|---|---|
| 2006/0102883 | A1* | 5/2006 | Troutman | E01F 15/0453 256/13.1 |
| 2008/0308779 | A1* | 12/2008 | Yu | E01F 15/0453 256/13.1 |
| 2016/0236165 | A1* | 8/2016 | Gosselin | A61K 8/922 |
| 2018/0291576 | A1* | 10/2018 | Yoo | E01F 15/0484 |

FOREIGN PATENT DOCUMENTS

| | | |
|---|---|---|
| KR | 10-0466411 B1 | 1/2005 |
| KR | 10-2006-0101310 A | 9/2006 |
| KR | 10-0897583 B1 | 5/2009 |
| KR | 10-2010-0109080 A | 10/2010 |
| KR | 10-2012-0007824 A | 1/2012 |
| KR | 10-1312933 B1 | 10/2013 |
| KR | 10-2017-0045220 A | 4/2017 |
| KR | 10-1796261 B1 | 11/2017 |
| KR | 10-1835000 B1 | 3/2018 |

\* cited by examiner

[FIG. 1]
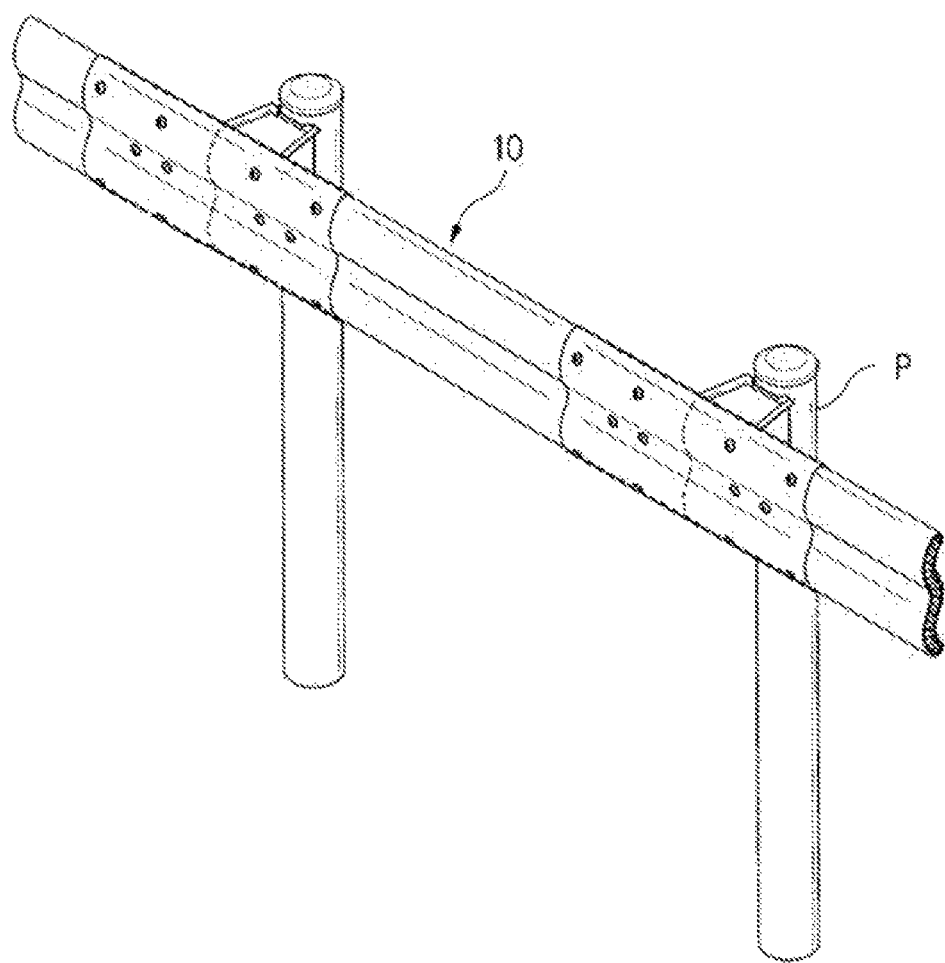

[FIG. 2]
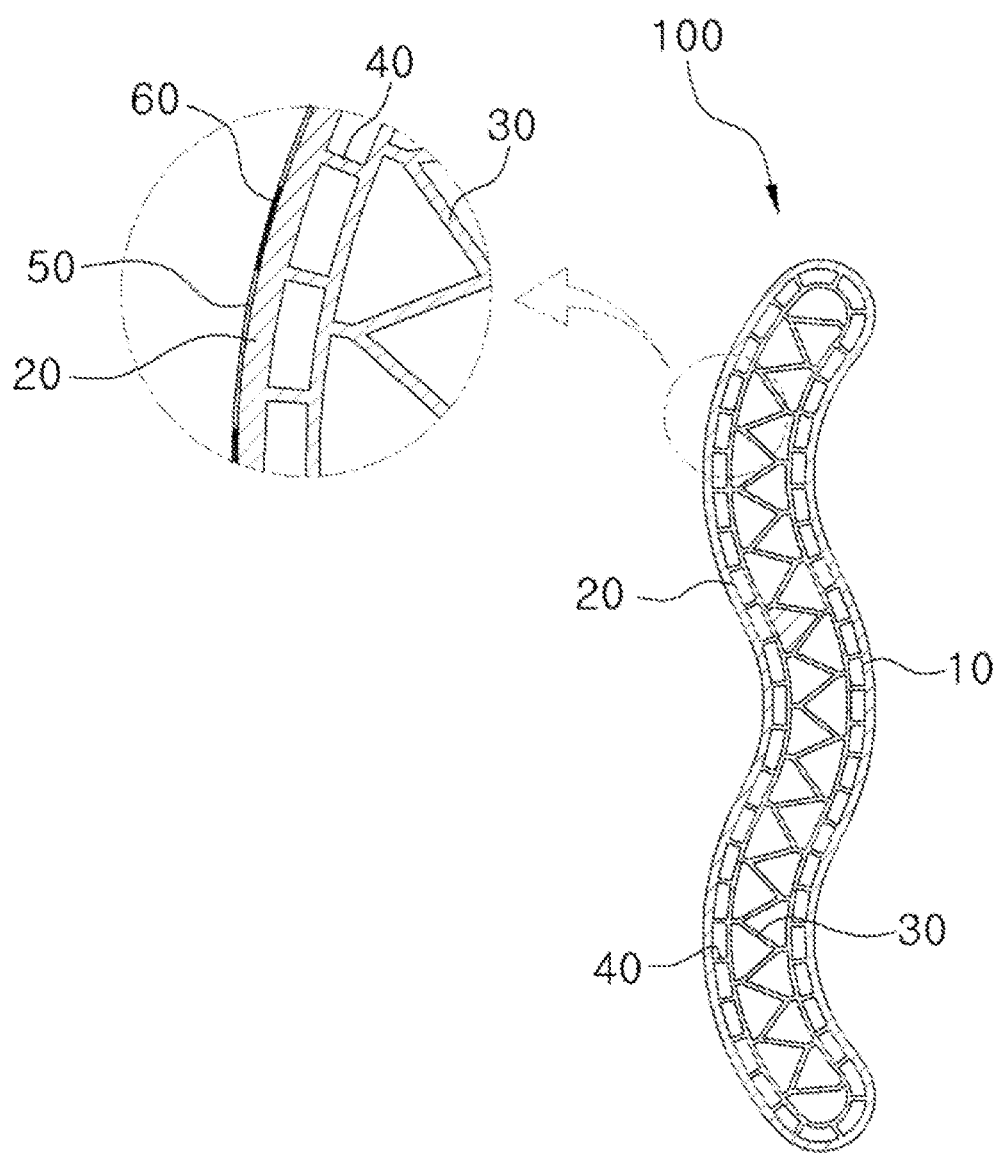

[FIG. 3]
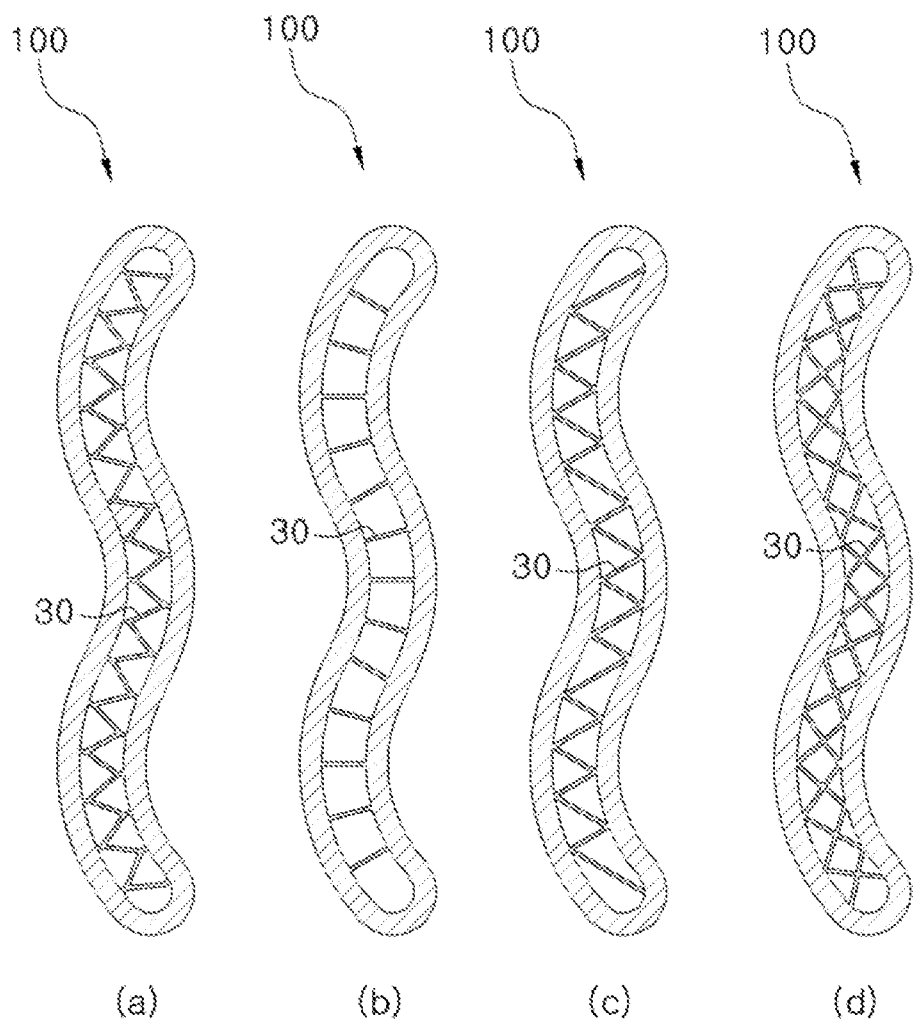
(a)      (b)      (c)      (d)

[FIG. 4]
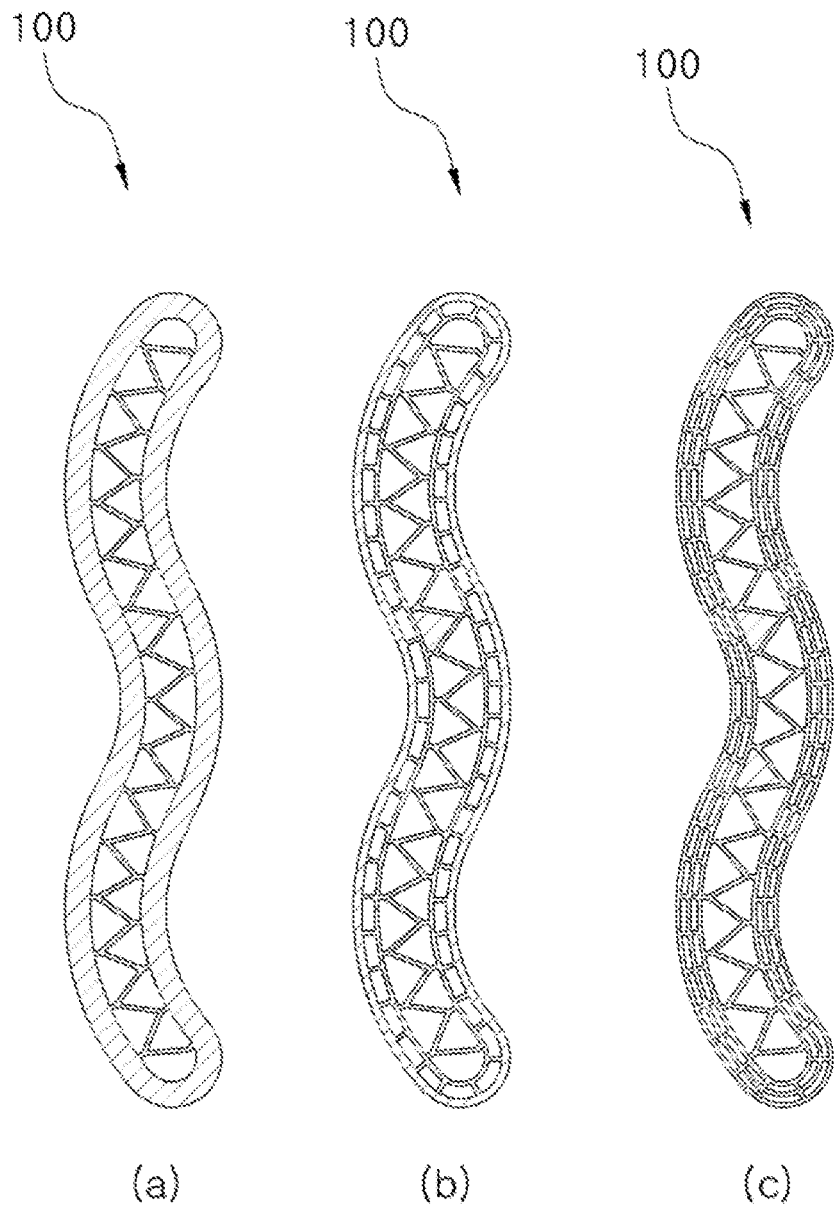
(a)  (b)  (c)

RESIN GUARDRAIL

TECHNICAL FIELD

The present invention relates to a resin guardrail and, more particularly, to a resin guardrail made of a plastic material installed along the roadside for guiding vehicle traffic and having improved durability.

BACKGROUND ART

Generally, guardrails are road facilities installed along roadsides to indicate road boundaries and to prevent a vehicle from running off the road. Such a guardrail needs to have high impact strength to prevent the vehicle from running off the road when the vehicle crashes into the guardrail, while simultaneously requiring a property of absorbing the impact applied to the vehicle and the guardrail. This requirement is particularly concerned with the protection of drivers and occupants.

In general, a guardrail is a pressed metal plate in a continuously curved form, and is continuously disposed and fixed to a rail post properly arranged along the roadside. Meanwhile, the guardrail made of metal has high strength but low impact absorption effect, which may threaten driver's safety when a vehicle crashes into the guardrail. Also, the metal guardrail tends to be easily contaminated with dirt, discolored, rusted, and deteriorated in visibility, so there is a problem in that a periodic painting work is required and the metal guardrail itself needs to be replaced after a certain time period.

To solve this problem, the applicant of the present invention has developed and installed a resin guardrail made of polyvinyl chloride (PVC) material. Due to the properties of PVC, the impact absorption effect is greater than that of metal material, and thus the safety is improved. Moreover, since the painting work thereof is more convenient than on metal material, there is an effect of realizing various colors and improving night visibility by using photoluminescent paint. In addition, the present invention is light in weight and excellent in workability, and when adding an ultraviolet shielding agent in the molding process, it is possible to reduce bleaching or discoloration, thereby greatly improving the service life of the guardrail itself.

In order to improve the durability and impact absorption performance of such a resin guardrail, in the related art, such as Korean Patent Nos. 10-0466411, 10-0897583, 10-1312933, and Korean Patent Application Publication No. 10-2010-109080, etc., the resin guardrail is provided by forming an air layer therein and connecting each layer by a linear rib or honeycomb rib of roughly a "dash (-)" shape, a "V" shape, or a "W" shape. This alteration in structure is expected to improve the impact absorption effect compared with that of the plate-type guardrail with the simple structure.

DISCLOSURE

Technical Problem

The present invention has been made in view of the related art as described above. Therefore, the objective of the present invention is to provide a resin guardrail having improved durability and impact resistance, by molding the resin guardrail through utilizing a resin composition composed of polyvinyl chloride (PVC) and acrylonitrile-butadiene-styrene (ABS).

Technical Solution

In order to solve the above problems of the present invention, there is provided a resin guardrail consisting of a resin composition containing polyvinyl chloride (PVC) and acrylonitrile-butadiene-styrene (ABS) and fixed to a vertical post (P), wherein the resin guardrail is produced by extrusion molding of the resin composition containing the polyvinyl chloride (PVC) and the acrylonitrile-butadiene-styrene (ABS), and wherein the resin composition is prepared by mixing 1 to 10 parts by weight of microcapsules containing acrylic acid ($CH_2=CHCOOH$), hydrogen peroxide ($H_2O_2$), lithium nitrate trihydrate ($LiNO_3 3H_2O$), and acrylonitrile ($CH_2CHCN$), based on 100 parts by weight of resin mixture containing a PVC compound and an ABS compound mixed at a weight ratio of 50:50 to 90:10.

In this case, the resin guardrail may include: an inner wall 10 providing a fixed surface to the post P; an outer wall 20 disposed to face the inner wall 10 to provide a contact surface against external impact; and a plurality of first ribs 30 connecting the inner wall 10 and the outer wall 20 together in a space therebetween.

In addition, each of the inner wall 10 and the outer wall 20 may have a double structure or a triple structure supported by a plurality of second ribs 40.

In addition, the microcapsules may be consisted of 5 to 10 parts by weight of the acrylic acid, 0.1 to 2 parts by weight of the hydrogen peroxide, 0.1 to 2 parts by weight of the lithium nitrate trihydrate, and 10 to 15 parts of weight of the acrylonitrile.

In addition, the microcapsules may be produced by capturing and encapsulating the resin mixture prepared by mixing the acrylic acid, the hydrogen peroxide, the lithium nitrate trihydrate, and the acrylonitrile, with a polymer selected from among high density polyethylene, low density polyethylene, linear low density polyethylene, ethylene ethyl acetate, polypropylene, and ethylene vinyl acetate, wherein a content of the polymer is in a range of 20 to 50% by weight, based on a total weight of the microcapsules.

Advantageous Effects

According to the present invention, the resin guardrail is produced by molding thereof utilizing a resin composition containing polyvinyl chloride (PVC) and acrylonitrile-butadiene-styrene (ABS), thereby exhibiting an effect of improving durability and impact resistance.

DESCRIPTION OF DRAWINGS

FIG. 1 is a perspective view showing an installation status of a resin guardrail of the present invention.

FIG. 2 is a cross-sectional view of the resin guardrail according to the present invention.

FIG. 3 is a conceptual diagram showing the first rib of various structures according to the present invention.

FIG. 4 is a conceptual diagram showing the structure of an inner wall and an outer wall of the resin guardrail and the second rib according to the present invention.

MODE FOR INVENTION

Hereinafter, the present invention will be described in more detail. The terms or words used in this description and claims are not to be construed as being limited to their ordinary or dictionary meanings, and should be interpreted as meanings and concepts corresponding to the technical spirit of the present invention based on the principle that inventors may properly define the concept of a term in order to best describe their invention.

The resin guardrail according to the present invention consists of a resin composition containing polyvinyl chloride (PVC) and acrylonitrile-butadiene-styrene (ABS). The resin guardrail is to be installed on the roadside as shown in FIG. 1, and has the same structure as a conventional guardrail which is continuously fixed to the vertical post P by using a bracket B in the horizontal direction or directly coupled and fixed to the vertical post P without a separate bracket.

Since resin guardrails for replacing commonly used metal plates require durability and impact resistance, which are equal to or better than those of metal plates, there is a need to optimize the materials constituting such resin guardrails.

In the present invention, a resin composition containing polyvinyl chloride (PVC) and acrylonitrile-butadiene-styrene (ABS) is used as a material for constituting the resin guardrail, and the guardrail of the present invention is produced in a shape that may be fixed through a bracket as shown in FIG. 1 by extrusion molding of the resin composition. In addition, the resin composition is made by mixing 1 to 10 parts by weight of microcapsules containing acrylic acid, hydrogen peroxide ($H_2O_2$), lithium nitrate trihydrate ($LiNO_3 3H_2O$), and acrylonitrile monomers, based on 100 parts by weight of resin mixture including the PVC compound and the ABS compound mixed at a weight ratio of 50:50 to 90:10.

Regarding the microcapsules, Korean Patent Nos. 10-1796261, 10-1796263, etc., disclose techniques in which a binding agent causes a binding reaction between cellulose molecules to improve adhesion by heat and pressure generated during molding using the binding agent containing an acid, a peroxide, a metal catalyst, and a non-reactive oil when producing a molded body by using a cellulose-based material such as wood. Referring to the related art, when an acid and a base are not to be reacted before a molding process, and are mixed with heat and pressure by the molding process, it is expected that the durability of a molded body itself may be improved by facilitating bonding between different resin molecules in the producing process of the molded body.

As a result of having performed various experiments in consideration of the related art, it is confirmed that the binding force of PVC and ABS is increased when the present invention is applied with microcapsules containing acrylic acid ($CH_2=CHCOOH$, pKa=4.25) as an acid component and hydrogen peroxide ($H_2O_2$, pKa=11.75) as a base component, and also containing lithium nitrate trihydrate ($LiNO_3 3H_2O$) and acrylonitrile ($CH_2CHCN$).

The acrylic acid generally has a pKa of about 4.25, and hydrogen peroxide has a pKa of about 11.75. These materials are mixed together by heat and pressure generated when PVC and ABS pass through the molding process, whereby enough energy to facilitate interfacial bonding between PVC and ABS is generated. Interfacial binding energy may also be generated by mixing various peroxides with other acid components such as hydrochloric acid, sulfuric acid, and nitric acid, but experimentally, the combination of acrylic acid and hydrogen peroxide shows the optimal effect in inducing the interfacial bond between PVC and ABS desired in the present invention.

In addition, the microcapsules contain lithium nitrate trihydrate ($LiNO_3 3H_2O$), which provides lithium ions in a water dispersed state, whereby the lithium nitrate trihydrate acts as a catalyst when the acrylic acid and hydrogen peroxide react with each other. Various metal catalysts may also be used to cause this catalytic reaction, but experimentally, lithium nitrate trihydrate has been found to be the most desirable to produce the reaction energy that may be obtained when applied to a mixture of PVC and ABS.

In addition, the microcapsules contain acrylonitrile, which is used as a monomer to form a block of ABS. However, it is understood that when contained in the microcapsules, the acrylonitrile inhibits the mixing of acrylic acid and hydrogen peroxide by the nitrile group, thereby exhibiting an effect of stably protecting the acid component. Therefore, in the case where the acrylonitrile is formulated with the mixture of acrylic acid and hydrogen peroxide in an appropriate proportion, the present invention shows that the mixture remains inactive until energy, such as heat and pressure, is applied from the outside.

In addition, it is preferable that the proportion of acrylic acid, hydrogen peroxide, lithium nitrate trihydrate, and acrylonitrile contained in the microcapsules consists of 5 to 10 parts by weight of acrylic acid, 0.1 to 2 parts by weight of hydrogen peroxide, 0.1 to 2 parts by weight of lithium nitrate trihydrate, and 10 to 15 parts of weight of acrylonitrile.

In particular, the proportion of acrylic acid and hydrogen peroxide is optimized to supply sufficient binding energy between PVC and ABS when the acrylic acid and hydrogen peroxide react. When the acrylic acid is too much or too little, the heat of reaction does not occur sufficiently, thereby degrading physical properties of the produced molded body. In addition, for the same reason, when the proportion of lithium nitrate trihydrate and lignin is out of the above-mentioned proportion, there occurs a problem in that the physical properties of the produced molded body is degraded.

The microcapsules may be produced by capturing and encapsulating the mixture prepared by mixing acrylic acid, hydrogen peroxide, lithium nitrate trihydrate, and acrylonitrile, with a polymer selected from among high density polyethylene, low density polyethylene, linear low density polyethylene, ethylene ethyl acetate, polypropylene, and ethylene vinyl acetate. This encapsulation is carried out by conventional droplet generation processes.

In addition, the polymer constituting the wall of the microcapsules is preferably in the range of 20 to 50% by weight, based on the total weight of the microcapsules. When the content of the polymer is too small, the wall structure of the microcapsules is weak and the contents are easily eluted. In addition, when the content of the polymer is too much, the microcapsules is not easily broken, so there occurs a problem in that it is difficult to induce the interfacial bonding between PVC and ABS in the molding process.

According to a conventional producing method for making the microcapsules, the method mixes acrylic acid, hydrogen peroxide, lithium nitrate trihydrate, and acrylonitrile, and then, after compatibly dispersing this mixture, a polymer, used as a wall material, is mixed with the mixture and encapsulated. A secondary crosslinking agent may be added when needed. In addition, the microcapsules may be obtained by drying the prepared microcapsules and grinding them under the state of making cryogenic conditions with liquid nitrogen. The bonding agent in the form of microcapsules thus produced is mixed in a proper proportion in consideration of the whole process.

In order to cause the interfacial reaction by the microcapsules, a temperature of 120° C. or more and a pressure of 30 kgf/cm$^2$ or more are required, so that the reaction may be sufficiently caused in a normal condition of the heat press molding. In addition, since the magnetic crosslinking occurs during the cooling and stabilization process after the molding process is completed, the adhesion between the interfaces of the PVC and the ABS, which completed the interfacial reaction, is further strengthened.

As such, the resin guardrail according to the present invention may enable the molded body to be formed by the blending of the PVC and ABS, which are known to have low compatibility. This is possible by improving the bonding force by using the microcapsules, in the process of extrusion molding of the resin composition including PVC and ABS. In addition, since the present invention contains ABS, it is possible to obtain an effect of improving durability and impact resistance compared with those of the guardrail made of the conventional PVC material.

The resin guardrail 100 is composed of an inner wall 10, an outer wall 20, and a first rib 30 to be coupled to a post P to improve impact resistance.

The inner wall 10 provides the resin guardrail a fixed surface for the post P.

The outer wall 20 is disposed to face the inner wall 10 to provide a contact surface against external impact.

The first rib 30 is composed of a plurality thereof, connecting space between the inner wall 10 and the outer wall 20.

In this way, the resin guardrail is made of a configuration such that the space between the inner wall 10 and the outer wall 20 is connected through the first rib 30.

At this time, the first ribs 30 are coupled to each other in various shapes as shown in FIG. 3.

That is, the first rib 30 has: as shown in (a) of FIG. 3, a 'Y' shape connecting between the inner wall 10 and the outer wall 20; as shown in (b) of FIG. 3, a 'T' shape connecting between the inner wall 10 and the outer wall 20; as shown in (c) of FIG. 3, a 'V' shape connecting between the inner wall 10 and the outer wall 20; or as shown in (d) of FIG. 3, an 'X' shape connecting between the inner wall 10 and the outer wall 20.

In addition, it is preferable that the inner wall 10 and the outer wall 20 are connected to each other, and have various shapes to improve the impact resistance.

Also, the inner wall 10 and the outer wall 20 have a double structure or a triple structure supported by a plurality of second ribs 40.

Therefore, as shown in (a) of FIG. 4, the inner wall 10 and the outer wall 20 have a single structure. Also, as shown in (b) of FIG. 4, the inner wall 10 and the outer wall 20 have a double structure supported through the second rib 40 between the double structure. Further, as shown in (c) of FIG. 4, the inner wall 10 and the outer wall 20 have a triple structure supported through the second rib 40 between the triple structure.

In this way, as shown in FIG. 4, when having the single structure, the inner wall 10 and the outer wall 20 connects the space therebetween through the first rib 30, and when having a double structure or a triple structure, the inner wall 10 and the outer wall 20 connects the space therebetween through the first rib 30 and the second rib 40.

In addition, although the inner wall 10 and the outer wall 20 is preferably made of any one of the single, double, and triple structure, it is possible to change to a multi-layer structure of the quadruple, pentagonal structure depending on the choice.

In this way, the inner wall 10, the outer wall 20, the first rib 30, and the second rib 40 are diversified depending on the use and installation conditions of the resin guardrail 100 to be able to produce various products.

In addition, the first rib 30 and the second rib 40 may have a shape and structure that may improve impact resistance by using the resin composition containing polyvinyl chloride (PVC) and acrylonitrile-butadiene-styrene (ABS), whereby design constraints may be eliminated.

In addition, the resin guardrail 100 may further include a photocatalyst coating layer 50 provided on the surface of the outer wall 20. In addition, although the strength of the guardrail may be increased when the coating layer is folioed by coating an acrylate-styrene-acrylonitrile (ASA) resin, in the present invention, enough strength may be obtained from the material constituting the guardrail body. Therefore, for the purpose of reducing the deterioration rate by ultraviolet rays after installation, a sufficient effect may be obtained only by forming the photocatalyst coating layer 50 using the coating material containing the photocatalyst.

In addition, the resin guardrail 100 may add a luminous coating layer 60 containing a luminous material to all or part of the surface of the outer wall 20. The luminous material is a material that receives light to store and emits the light in a dark environment. The application of the luminous coating layer provides a certain level of brightness to a vehicle driving at night, and thus there is an effect of giving the drivers information about the surrounding road conditions such as the presence of a guardrail, its location, and the road driving line, etc.

In addition, when forming the coating layers (50, 60), in order to protect the coating layer and to prevent the coating layer from peeling, the molding process is performed for the region, to which the coating layers are applied, to become embedded, whereby the coating layers may be made on the same planar surface as the outer wall 20 without a step after applying the coating layers (50, 60).

The photocatalyst coating layer 50 uses a paint containing a photocatalyst, and titanium dioxide ($TiO_2$) may be applied as the photocatalyst.

In particular, when the surface of titanium dioxide particles includes a promoter such as silver (Ag), copper (Cu), or lead (Pb), it has been shown to exhibit remarkably excellent response characteristics and photocatalytic functions against ultraviolet rays and visible light. At this time, the promoter included on the titanium dioxide is preferably 0.1 parts by weight to 5 parts by weight, based on 100 parts by weight of titanium dioxide. In addition, the inclusion of the promoter may be performed by a conventional evaporation drying method.

In order to evaluate the physical properties of the resin guardrail according to the present invention, the test evaluation is carried out as follows.

Microcapsules are prepared for the production of the resin composition.

An aqueous base was prepared by combining 8 parts by weight of acrylic acid, 1 part by weight of hydrogen peroxide (30 vol %, based on hydrogen peroxide), 1 part by weight of lithium nitrate trihydrate, and 12 parts by weight of acrylonitrile. While stirring the prepared aqueous phase, an oily substance obtained by melting high density polyethylene (density: 0.940 $g/cm^3$, weight average molecular weight: 30,000) in a mixed solvent of acetone and ethanol is slowly added to make droplets. The organic solvent of the prepared droplets is removed and concentrated to prepare an aqueous dispersion of microparticles. The microparticles have an average diameter of 50 μm, and are filtered by using a membrane filter to prepare microparticle dispersion.

To prepare a resin composition, 80 parts by weight of PVC compound and 20 parts by weight of ABS compound are mixed, and then a microcapsule aqueous dispersion is added to become 8 parts by weight thereof, on the basis of the dry weight of the microcapsules, so as to prepare the resin composition.

The prepared resin composition is extruded at a temperature of 150° C. to prepare the first rib of the 'Y' shape and a resin guardrail of a structure as shown in FIG. 1, in which the inner wall and the outer wall have a double structure.

The resin guardrail produced as described above is subjected to the SB2 grade crash test according to the 'Full-scale vehicle & barrier crash test for roadside safety facilities' conducted by the Korea Transportation Safety Authority.

The test method is carried out with strength performance evaluation and occupant protection performance evaluation, respectively. The specifications and experimental conditions of the resin guardrail are made as follows.

The resin guardrail has specifications with height of 750 mm, minimum installation length of 30 m, and horizontal bearing capacity for the supporting post of 4.49 tonf (i.e., ton-force).

The strength performance evaluation is carried out under the conditions with test vehicle weight (kg): 8030 (8,000, ±5%), impact speed (km/h): 65.7 (65, 0~7%), impact angle (°): 15 (15, ±1.5°), and impact degree (kJ): 89.6 (90).

The occupant protection performance evaluation is carried out under the conditions with test vehicle weight (kg): 1,321 (1,300, ±5%), impact speed (km/h): 80.1 (80, 0~7%), and impact angle (°): 20 (20, ±1.5%).

As a result of testing of the roadside barrier performance under these conditions, the experimental results satisfy the SB2 grade standard: the structural performance and vehicle behavior after crash in the strength performance evaluation; and the occupant protection performance and vehicle behavior after crash in the occupant protection performance evaluation.

Through these results, the resin guardrail meets the SB2 grade (roadside embankment) in the facility type of soft roadside barrier.

In addition, the results of the evaluation of occupant protection performance (Acceleration Severity Index, ASI) are shown in Table 1.

TABLE 1

| ASI average of metal plate products passed the vehicle crash test | ASI value of the exemplary embodiment | |
|---|---|---|
| 1.19 | Test result | 0.8 |
| | Test result | 0.99/0.77 |

Referring to the results of Table 1, the resin guardrail prepared by using the resin composition of the present invention satisfies the SB2 standard according to the roadside barrier crash test.

In addition, the occupant protection performance (in ASI) is a numerical value representing the sum of the ratios for the respective limit accelerations of the 50 ms average acceleration in each direction of the vehicle x, y, z. The ASI always has a positive value, and the greater than the ASI of 1, the greater the risk of occupants.

As described above, the resin guardrail made of the composition according to the present invention passes the roadside barrier crash test of the "Korea Traffic Safety Corporation" and indicates the SB2 grade.

In addition, for comparison, 80 parts by weight of PVC compound and 20 parts by weight of ABS compound are mixed, and then extruded at a temperature of about 200° C. to prepare the resin guardrail having the same structure as in the above exemplary embodiment. In this case, the prepared resin guardrail is evaluated as described above, and the result of the crash test under the same conditions shows that the ASI value is 1.0 to 1.1, which does not satisfy the performance of the SB2 grade.

These results show that it is difficult to ensure sufficient durability due to poor compatibility between PVC and ABS when molding with heterogeneous resin compounds. By including the microcapsules as in the present invention, it is verified that there is an optimized effect for molding of the resin guardrail.

The rights of the present invention are not limited to the exemplary embodiments described above, but are defined by the claims, and it will be understood by those skilled in the art that various modifications in form and details may be made therein without departing from the spirit and scope of the invention as defined by the appended claims.

The invention claimed is:

1. A resin guardrail consisting of a resin composition containing polyvinyl chloride (PVC) and acrylonitrile-butadiene-styrene (ABS) and fixed to a vertical post (P),
   wherein the resin guardrail is produced by extrusion molding of the resin composition containing the polyvinyl chloride (PVC) and the acrylonitrile-butadiene-styrene (ABS), and
   wherein the resin composition is prepared by mixing 1 to 10 parts by weight of microcapsules containing acrylic acid ($CH_2$=CHCOOH), hydrogen peroxide ($H_2O_2$), lithium nitrate trihydrate ($LiNO_3 3H_2O$), and acrylonitrile ($CH_2CHCN$), based on 100 parts by weight of resin mixture containing a PVC compound and an ABS compound mixed at a weight ratio of 50:50 to 90:10.

2. The resin guardrail of claim 1, wherein the resin guardrail comprises:
   an inner wall (10) providing a fixed surface to the post (P);
   an outer wall (20) disposed to face the inner wall (10) to provide a contact surface against external impact; and
   a plurality of first ribs (30) connecting the inner wall (10) and the outer wall (20) together in a space therebetween.

3. The resin guardrail of claim 2, wherein each of the inner wall (10) and the outer wall (20) has a double structure or a triple structure supported by a plurality of second ribs (40).

4. The resin guardrail of claim 1, wherein the microcapsules are consisted of 5 to 10 parts by weight of the acrylic acid, 0.1 to 2 parts by weight of the hydrogen peroxide, 0.1 to 2 parts by weight of the lithium nitrate trihydrate, and 10 to 15 parts of weight of the acrylonitrile.

5. The resin guardrail of claim 1, wherein the microcapsules are produced by capturing and encapsulating the resin mixture prepared by mixing the acrylic acid, the hydrogen peroxide, the lithium nitrate trihydrate, and the acrylonitrile, with a polymer selected from among high density polyethylene, low density polyethylene, linear low density polyethylene, ethylene ethyl acetate, polypropylene, and ethylene vinyl acetate, wherein a content of the polymer is in a range of 20 to 50% by weight, based on a total weight of the microcapsules.

* * * * *